(12) United States Patent
Farmer et al.

(10) Patent No.: US 12,657,327 B1
(45) Date of Patent: Jun. 16, 2026

(54) SYSTEMS AND METHODS FOR DATA COMPLIANCE

(71) Applicant: United Services Automobile Association (USAA), San Antonio, TX (US)

(72) Inventors: William Daniel Farmer, Carrollton, TX (US); Thomas Wayne Schwarz, Jr., Helotes, TX (US); Keegan Patrick Hayes, Whitestown, IN (US); Nolan Serrao, Plano, TX (US); Gideon Bowie Luck, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 29 days.

(21) Appl. No.: 18/819,061

(22) Filed: Aug. 29, 2024

Related U.S. Application Data

(60) Provisional application No. 63/579,911, filed on Aug. 31, 2023.

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 10,068,098 B2 * | 9/2018 | Embleton | ............. H04L 63/107 |
| 11,748,496 B1 | 9/2023 | Philbrick et al. | |
| 12,158,962 B1 * | 12/2024 | Philbrick | ................ G06F 21/62 |
| 12,217,323 B2 * | 2/2025 | Mesde | ................ G06F 16/2365 |
| 2023/0334038 A1 * | 10/2023 | Kureshi | ............. G06F 16/2358 |

* cited by examiner

*Primary Examiner* — Han Yang
(74) *Attorney, Agent, or Firm* — BakerHostetler

(57) ABSTRACT

Systems and methods for providing a compliance solution for data storage (e.g., in compliance with a more restrictive solution chosen from among a plurality of storage solutions) are disclosed herein. The methods include receiving a request to store data, accessing a first set of jurisdictional rules applicable to storage of the data, accessing a second set of jurisdictional rules applicable to storage of the data that is divergent from the first set of jurisdiction rules with respect to storage of the data, determining that a first jurisdictional restriction among the first set of jurisdictional rules applicable to storage of the data is more restrictive than a first jurisdictional restriction among the second set of jurisdictional rules applicable to storage of the data, and storing the data in compliance with the first jurisdictional restriction among the first set of jurisdictional rules applicable to storage of the data.

20 Claims, 6 Drawing Sheets

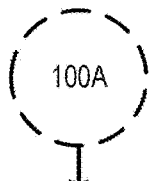

140A: DETERMINE THAT FIRST JURISDICTIONAL RESTRICTION AMONG FIRST SET OF JURISDICTIONAL RULES APPLICABLE TO STORAGE OF FIRST PORTION OF DATA IS MORE RESTRICTIVE THAN FIRST JURISDICTIONAL RESTRICTION AMONG SECOND SET OF JURISDICTIONAL RULES APPLICABLE TO STORAGE OF FIRST PORTION OF DATA

150A: STORE FIRST PORTION OF DATA IN COMPLIANCE WITH FIRST JURISDICTIONAL RESTRICTION AMONG FIRST SET OF JURISDICTIONAL RULES APPLICABLE TO FIRST PORTION OF DATA

140B: DETERMINE THAT SECOND JURISDICTIONAL RESTRICTION AMONG FIRST SET OF JURISDICTIONAL RULES APPLICABLE TO STORAGE OF SECOND PORTION OF DATA IS LESS RESTRICTIVE THAN SECOND JURISDICTIONAL RESTRICTION AMONG SECOND SET OF JURISDICTIONAL RULES APPLICABLE TO STORAGE OF SECOND PORTION OF DATA

150B: STORE SECOND PORTION OF DATA IN COMPLIANCE WITH SECOND JURISDICTIONAL RESTRICTION AMONG SECOND SET OF JURISDICTIONAL RULES APPLICABLE TO SECOND PORTION OF DATA

SYSTEMS AND METHODS FOR DATA COMPLIANCE

CROSS-REFERENCE TO RELATED APPLICATIONS

This application claims priority to and the benefit of U.S. Provisional Patent Application No. 63/579,911, filed Aug. 31, 2023, which is incorporated herein by reference in its entirety.

TECHNICAL FIELD

The disclosure generally relates to systems and method for providing a compliance solution for data storage (e.g., in compliance with a more restrictive solution chosen from among a plurality of storage solutions), namely by determining which of a plurality of jurisdictional restrictions among a set of jurisdictional rules applicable to storage of data is more restrictive.

BACKGROUND

National and state laws increasingly restrict the storage of data. These laws may not be consistent between jurisdictions, and parties subject to or owning such data may operate in multiple jurisdictions or move between jurisdictions. Additionally, data and privacy rules are often changing and evolving. It is challenging to develop methods and systems for changing and/or unknown compliance requirements. Accordingly, techniques for providing a compliance solution for data storage would benefit parties in many instances.

SUMMARY

In an embodiment, a method for providing a compliance solution for data storage comprises: receiving a request to store data; accessing a first set of jurisdictional rules applicable to storage of the data, wherein the first set of jurisdictional rules are associated with a first jurisdiction; accessing a second set of jurisdictional rules applicable to storage of the data, wherein the second set of jurisdictional rules are associated with a second jurisdiction different from the first jurisdiction and the first set of jurisdictional rules and the second set of jurisdictional rules are divergent with respect to storage of the data; determining that a first jurisdictional restriction among the first set of jurisdictional rules applicable to storage of the data is more restrictive than a first jurisdictional restriction among the second set of jurisdictional rules applicable to storage of the data; and storing the data in compliance with the first jurisdictional restriction among the first set of jurisdictional rules applicable to storage of the data.

In embodiments, the data may include a first portion of data and a second portion of data. In such embodiments, the method may provide a synthesized compliance solution for data storage by determining that a first jurisdictional restriction among the first set of jurisdictional rules applicable to storage of the first portion of data is more restrictive than a first jurisdictional restriction among the second set of jurisdictional rules applicable to storage of the first portion of data, determining that a second jurisdictional restriction among the first set of jurisdictional rules applicable to storage of the second portion of data is less restrictive than a second jurisdictional restriction among the second set of jurisdictional rules applicable to storage of the second portion of data, storing the first portion of data in compliance with the first jurisdictional restriction among the first set of jurisdictional rules applicable to storage of the first portion of data, and storing the second portion of data in compliance with the second jurisdictional restriction among the second set of jurisdictional rules applicable to storage of the second portion of data.

In embodiments, accessing the first set of jurisdictional rules may include accessing the first set of jurisdictional rules from a database storing a plurality of sets of jurisdictional rules. In embodiments, accessing the second set of jurisdictional rules may include accessing the second set of jurisdictional rules from the database.

In embodiments, the request to store data may be received from a client. In embodiments, a location of the client may be determined. In embodiments, it may be determined whether the first set of jurisdictional rules, the second set of jurisdictional rules, or both are applicable to storage of the data based on the location of the client. In embodiments, it may be determined that the client has relocated from the first jurisdiction to the second jurisdiction. In embodiments, the data may be stored in compliance with the first jurisdictional restriction among the second set of jurisdictional rules applicable to storage of the data. In embodiments, it may be determined that the client has relocated from the first jurisdiction to the second jurisdiction based on accessing activity of the client. In embodiments, it may be determined that the client has relocated from the first jurisdiction to the second jurisdiction based on location information provided by the client. In embodiments, based on the location of the client, the client's request to store data may be denied. In embodiments, based on the location of the client, a disclaimer may be provided to the client regarding storage of the data. In embodiments, based on the location of the client, the client may be required to provide informed consent regarding storage of the data. In embodiments, it may be determined whether the data can be stored in the second jurisdiction in compliance with the first jurisdictional restriction among the second set of jurisdictional rules applicable to storage of the data. In embodiments, it may be determined that the data can be stored in the second jurisdiction in compliance with the first jurisdictional restriction among the second set of jurisdictional rules applicable to storage of the data, and the data may be transferred to the second jurisdiction and the data may be stored in compliance with the first jurisdictional restriction among the second set of jurisdictional rules applicable to storage of the data. In embodiments, it may be determined that the data cannot be stored in the second jurisdiction in compliance with the first jurisdictional restriction among the second set of jurisdictional rules applicable to storage of the data, and transfer of the data to the second jurisdiction may be prevented and the data may be stored in compliance with the first jurisdictional restriction among the first set of jurisdictional rules applicable to storage of the data.

In embodiments, it may be determined that at least one of the first jurisdictional restriction and the second jurisdictional restriction has changed. In embodiments, it may be determined that the first jurisdictional restriction among the first set of jurisdictional rules applicable to storage of the data remains more restrictive than the first jurisdictional restriction among the second set of jurisdictional rules applicable to storage of the data, and the data may be maintained as stored in compliance with the first jurisdictional restriction among the first set of jurisdictional rules applicable to storage of the data. In embodiments, it may be determined that the first jurisdictional restriction among the first set of jurisdictional rules applicable to storage of the data has become less restrictive than the first jurisdictional restriction among the second set of jurisdictional rules applicable to storage of the data, and the data may be transferred to the second jurisdiction and the data may be stored in compliance with the first jurisdictional restriction among the second set of jurisdictional rules applicable to storage of the data.

In an embodiment, a system for providing a compliance solution for data storage comprises a non-transitory computer-readable medium storing instructions that when executed by a processor effectuate a compliance manager configured to: receive a request to store data; access a first set of jurisdictional rules applicable to storage of the data, wherein the first set of jurisdictional rules are associated with a first jurisdiction; access a second set of jurisdictional rules applicable to storage of the data, wherein the second set of jurisdictional rules are associated with a second jurisdiction different from the first jurisdiction and the first set of jurisdictional rules and the second set of jurisdictional rules are divergent with respect to storage of the data; determine that a first jurisdictional restriction among the first set of jurisdictional rules applicable to storage of the data is more restrictive than a first jurisdictional restriction among the second set of jurisdictional rules applicable to storage of the data; and store the data in compliance with the first jurisdictional restriction among the first set of jurisdictional rules applicable to storage of the data.

In an embodiment, a system for providing a compliance solution for data storage comprises: means for receiving a request to store data; means for accessing a first set of jurisdictional rules applicable to storage of the data, wherein the first set of jurisdictional rules are associated with a first jurisdiction; means for accessing a second set of jurisdictional rules applicable to storage of the data, wherein the second set of jurisdictional rules are associated with a second jurisdiction different from the first jurisdiction and the first set of jurisdictional rules and the second set of jurisdictional rules are divergent with respect to storage of the data; means for determining that a first jurisdictional restriction among the first set of jurisdictional rules applicable to storage of the data is more restrictive than a first jurisdictional restriction among the second set of jurisdictional rules applicable to storage of the data; and means for storing the data in compliance with the first jurisdictional restriction among the first set of jurisdictional rules applicable to storage of the data.

The details above in this Summary are intended to describe only some aspects relating to certain embodiments of the innovations herein, and should not be deemed in any way limiting with respect to requiring or omitting any aspect for embodiments to be claimed or otherwise limiting the disclosure or embodiments keeping with its scope or spirit.

BRIEF DESCRIPTION OF DRAWINGS

FIG. 1 illustrates a system for providing a compliance solution for data storage disclosed herein.

FIG. 3 illustrates a sub-method for providing a compliance solution for data storage disclosed herein.

DETAILED DESCRIPTION

Figure 2:
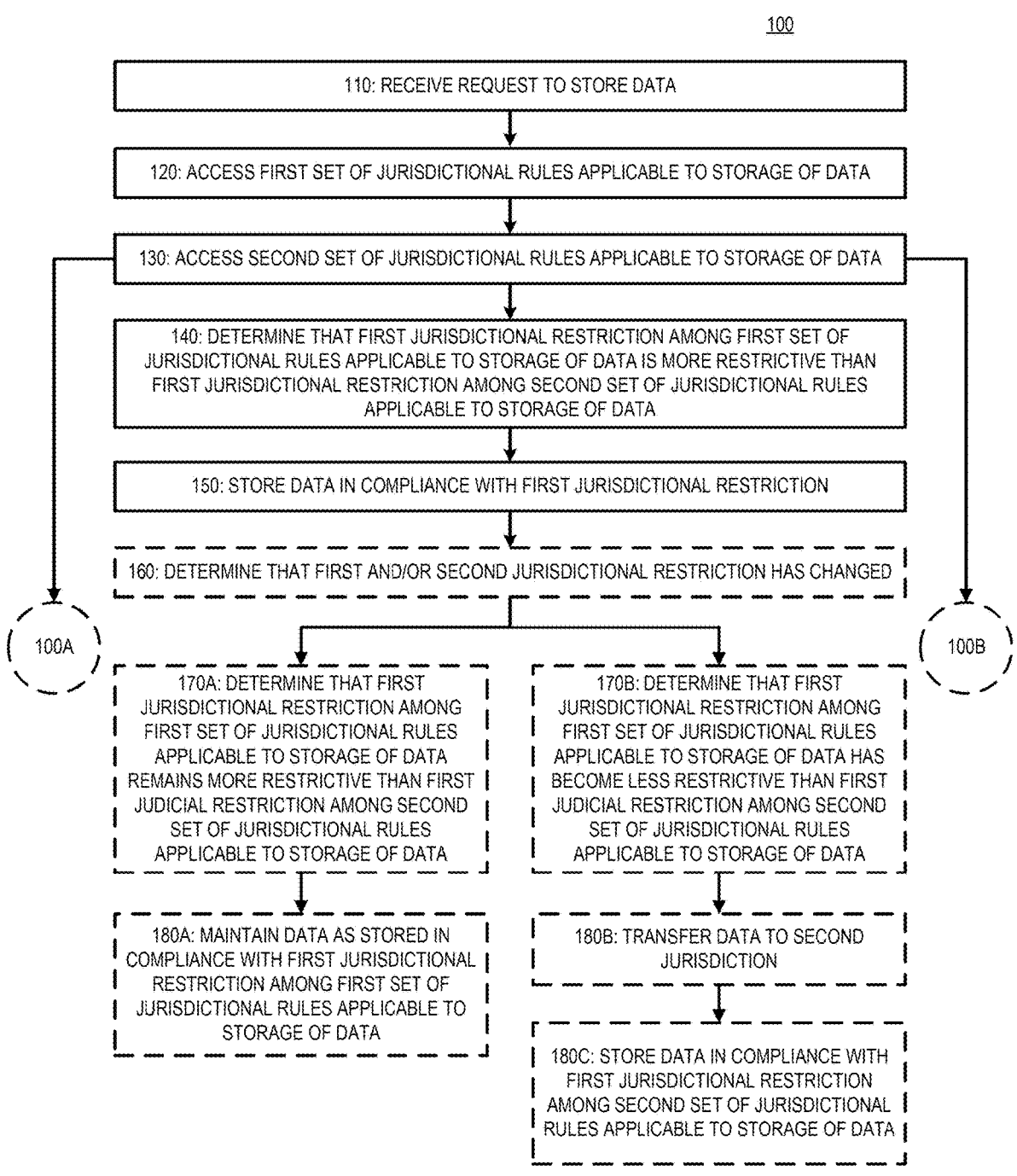
FIG. 2 illustrates a method for providing a compliance solution for data storage disclosed herein.

Techniques for providing a compliance solution for data storage would benefit parties in many instances, such as where the data storage and/or privacy rules are often changing and evolving and/or a client or user frequently moves between locations/jurisdictions having divergent sets of jurisdictional rules with respect to storage of the data (e.g., military personnel and their families, insured parties, parties traveling for medical treatment, et cetera). In this regard, the present disclosure builds upon prior data protection and/or compliance solutions, such as those described in U.S. patent application Ser. No. 16/942,216 titled "Data Jurisdiction Management," the entirety of which is incorporated by reference herein for all purposes.

Figure 1:
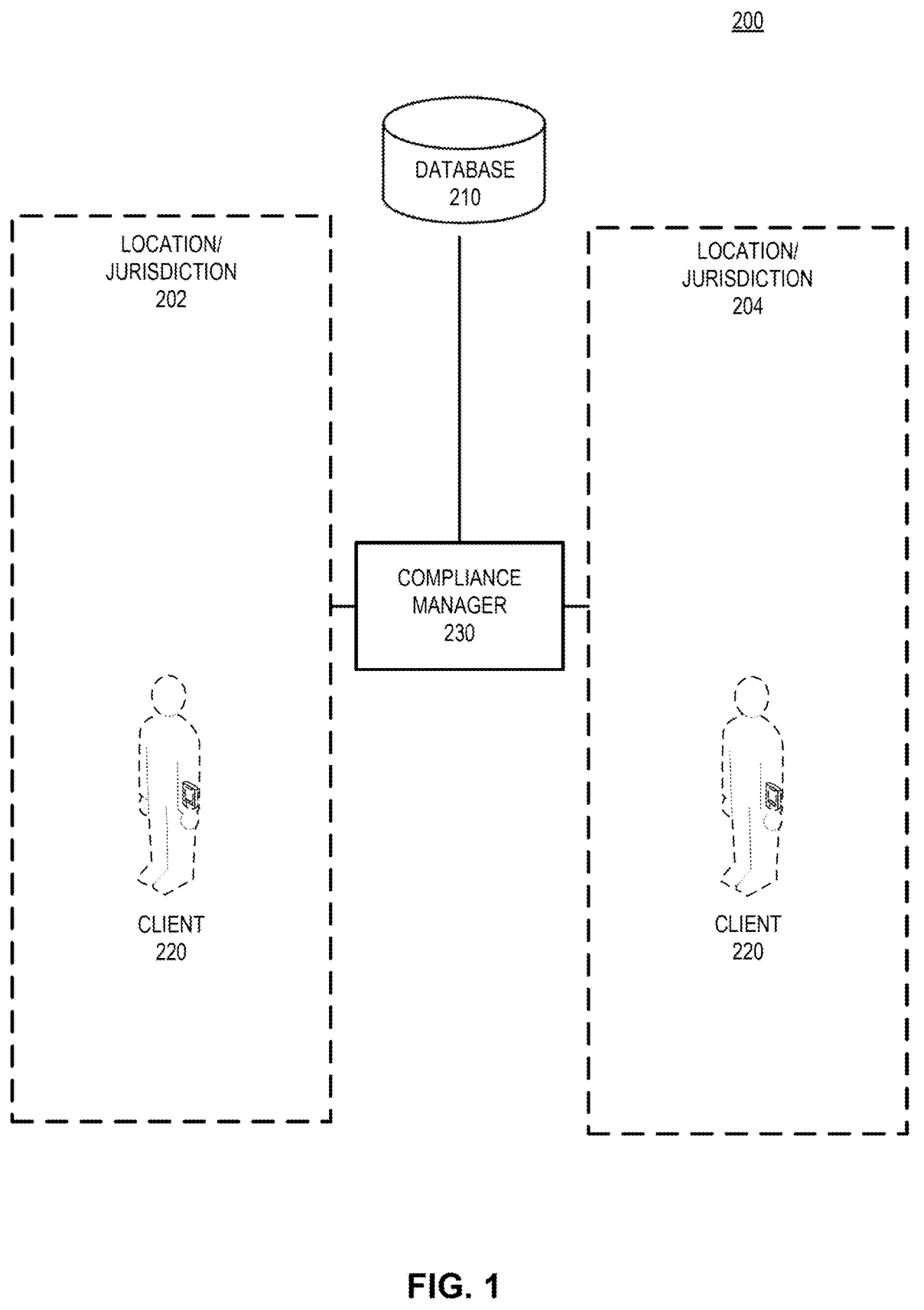

FIG. 1 illustrates an example system 200 for providing a compliance solution for data storage. System 200 includes compliance manager 230, client(s) 220, and database 210.

Database 210 may be configured to store a plurality of sets of jurisdictional rules applicable to storage of the data from database 210. As will be appreciated by those skilled in the art, the term "set" is used in its mathematical sense to define a plurality of jurisdictional rules or a single jurisdictional rule (e.g., a unit set or singleton). Database 210 may, in embodiments, be periodically or continuously updated such that the plurality of sets of jurisdictional rules applicable to storage of the data are updated and current and accurately reflect, for example, the data storage and/or privacy laws applicable to the data for a given location/jurisdiction. By way of non-limiting example, database 210 may be updated each time that the jurisdictional rules are updated and/or each time that a client/user moves between locations/jurisdictions.

Database 210 may, in embodiments, may further be configured to store data requested to be stored by the client(s) 220 and any metadata associated therewith. In other embodiments, data requested to be stored by the client(s) 220 may be stored in another database different from database 210 within which the plurality of sets of jurisdictional rules applicable to storage of the data are stored. Data may be provided to database 210 via any suitable means (e.g., via an API call, via a third-party service), and may be accessed by any components of system 200. Database 210 may be physically located within a first location/jurisdiction 202, a second location/jurisdiction 204, or another location/jurisdiction. In embodiments, database 210 may be cloud-based.

Client(s) 220 is communicatively coupled to compliance manager 230 and/or database 210. Client(s) 220 may generally be communicatively coupled to compliance manager 230 and/or database 210 by any suitable means as desired to suit a particular application. By way of non-limiting example, client(s) 220 may operate a mobile phone, a tablet, a laptop, or the like and may be communicatively coupled to compliance manager 230 and/or database 210 over a network (e.g., a cloud-based network). Client(s) 220 are generally configured to send a request to store data to compliance manager 230. In certain embodiments, client(s) 220 may be configured to send a request to store data to database 210 and/or to receive data from database 210 and/or compliance manager 230. As illustrated in FIG. 1, client(s) 220 may be physically located within a first location/jurisdiction 202, a second location/jurisdiction 204, or another location/jurisdiction. In some embodiments, client(s) 220 may be physically located in the same location/jurisdiction as compliance manager 230 and/or database 210, although other embodiments are not so limited. In certain embodiments, a particular database may be chosen based on jurisdictional rules associated with storage of a particular client's data (e.g., by compliance manager 230).

Compliance manager 230 is communicatively coupled to client(s) 220 and database 210. Compliance manager 230 is generally configured to receive a request to store data from client(s) 220. Compliance manager 230 is further generally configured to access a plurality of sets of jurisdictional rules applicable to storage of the data from database 210. While illustrated as a single element, compliance manager 230 may be implemented within or outside first location/jurisdiction 202 and/or second location/jurisdiction 204 in one or more identical or differing instances or services. Various network or cloud resources can be used to provide resources to host, run, instantiate, and/or otherwise provide services of varying functionality that are compliant with a data control involving first location/jurisdiction 202 and/or second location/jurisdiction 204. Compliance manager 230 may be physically located within a first location/jurisdiction 202, a second location/jurisdiction 204, or another location/jurisdiction. In certain embodiments, a location/jurisdiction within which compliance manager 230 is physically located may be chosen based on jurisdictional rules associated with storage of a particular client's data (e.g., by compliance manager 230).

The compliance manager 230 is generally configured to determine whether routing is available for satisfying the request to store data by managing and/or actioning the request using data control compliant services or resources. In embodiments, the compliance manager 230 may be configured to store data with highest compliance positioned in a location/jurisdiction with the lowest obligations and/or in a location/jurisdiction that historically has the fewest or "easiest" data storage or privacy rules. In embodiments, the compliance manager 230 may be configured to store data in accordance with the most restrictive storage solution among a plurality of storage solutions. The compliance manager 230 is generally configured to make on-the-fly decisions regarding storage of the data based upon the accessed plurality of sets of jurisdictional rules.

Although FIG. 1 illustrates database 210 and compliance manager 230 as separate components and as separate from client(s) 220, it is to be understood that database 210 and/or compliance manager 230 could be employed within client(s) 220, as desired, or database 210, compliance manager 230, and client(s) 220 can be communicatively coupled to one another (e.g., over a network). In embodiments, client(s) 220 may be communicatively coupled to database 210 via compliance manager 230.

Figure 4:
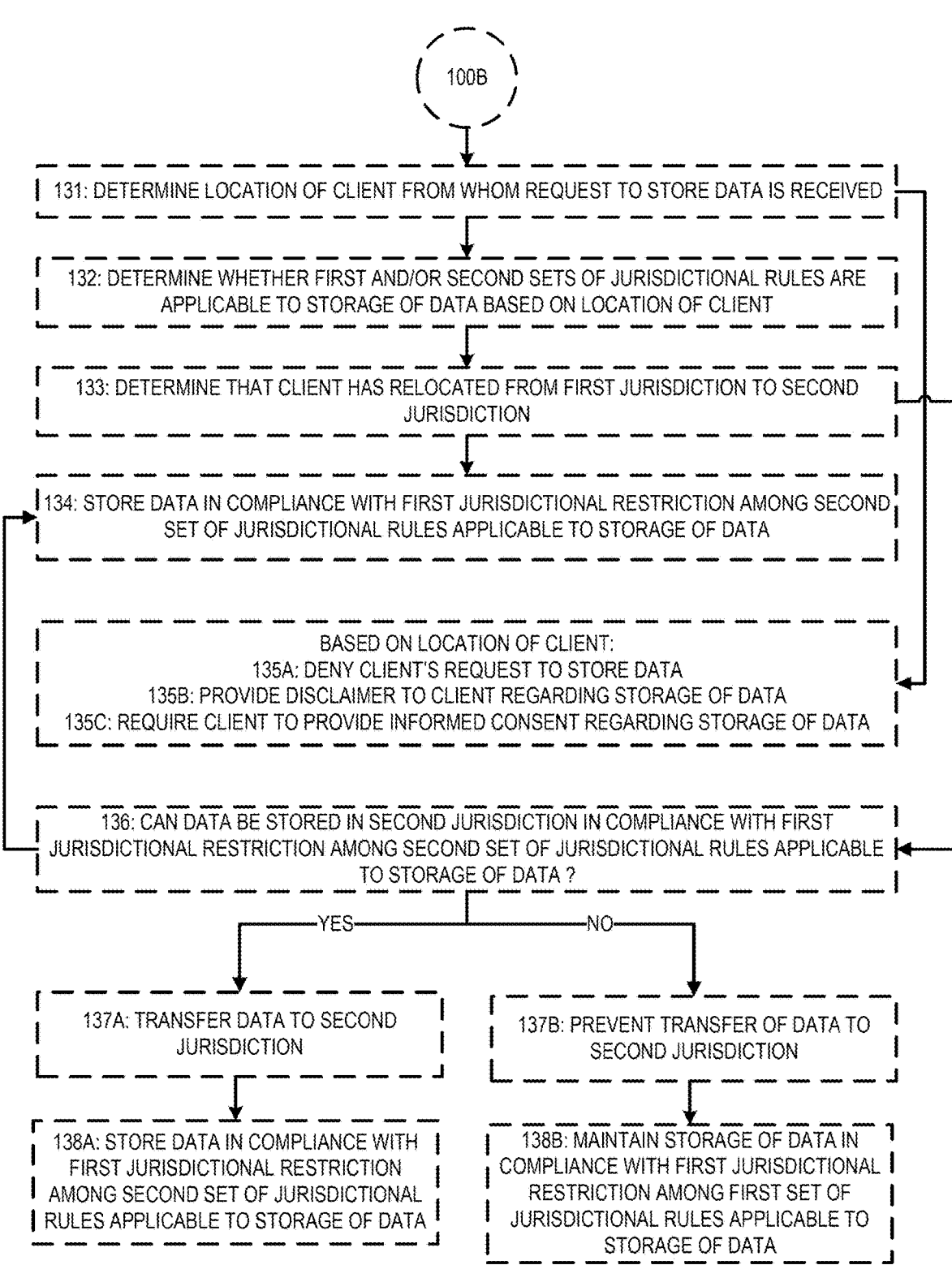
FIG. 4 illustrates another sub-method for providing a compliance solution for data storage disclosed herein.

FIG. 2 illustrates an example methodology 100 for providing a compliance solution for data storage. FIG. 3 illustrates example sub-methodology 100A of methodology 100, and FIG. 4 illustrates example sub-methodology 100B of methodology 100. Methodologies 100, 100A, and 100B can be implemented using instructions stored on a non-transitory computer-readable medium that when executed by a processor effectuate a compliance manager (e.g., compliance manager 230) to perform methodologies 100, 100A, and 100B.

As illustrated in FIG. 2, methodology 100 starts at 110 where a request to store data is received. For example, the request may be received by compliance manager 230 from client 220. In the interests of efficiency, methodologies 100, 100A, and 100B will generally be described with reference to a single client 220, a single database 210, and a single compliance manager 230, although it is to be understood that multiple of the foregoing may be provided as desired to suit a particular application.

At 120, a first set of jurisdictional rules applicable to storage of the data are accessed. For example, the first set of jurisdictional rules applicable to storage of the data may be accessed by compliance manager 230 from database 210. The first set of jurisdictional rules are generally associated with a first jurisdiction, such as location/jurisdiction 202. Similarly, at 130, a second set of jurisdictional rules applicable to storage of the data are accessed. For example, the second set of jurisdictional rules applicable to storage of the data may be accessed by compliance manager 230 from database 210 and/or from another database. The second set of jurisdictional rules are generally associated with a second jurisdiction, such as location/jurisdiction 204. The second jurisdiction is generally different from the first jurisdiction. The first set of jurisdictional rules and the second set of jurisdictional rules are generally divergent with respect to storage of the data (i.e., non-overlapping but potentially intersecting in certain respects). By way of non-limiting example, the first set of jurisdictional rules and the second set of jurisdictional rules may be divergent based on one or more of the type of the data, the age of the data, or the like, including combinations thereof.

As illustrated in FIG. 2, after 130, methodology may proceed 140 or may proceed to sub-methodology 100A and/or sub-methodology 100B. Continuing with FIG. 2, at 140, it is determined whether a first jurisdictional restriction among the first set of jurisdictional rules applicable to storage of the data is more or less restrictive than a first jurisdictional restriction among the second set of jurisdictional rules applicable to storage of the data. For example, the compliance manager 230 may generally make such a determination. If, for example, it is determined that the first jurisdictional restriction among the first set of jurisdictional rules applicable to storage of the data is more restrictive than the first jurisdictional restriction among the second set of jurisdictional rules applicable to storage of the data, at 150, the data is stored in compliance with the first jurisdictional restriction among the first set of jurisdictional rules applicable to storage of the data (as illustrated in FIG. 2). For example, the compliance manager 230 may store the data in the database 210, which may be present in the first location/ jurisdiction 202 or elsewhere. Conversely, if it is determined that the first jurisdictional restriction among the first set of jurisdictional rules applicable to storage of the data is less restrictive than the first jurisdictional restriction among the second set of jurisdictional rules applicable to storage of the data, the data is stored in compliance with the first jurisdictional restriction among the second set of jurisdictional rules applicable to storage of the data (not shown).

Continuing with FIG. 2, at 160, it may optionally be determined whether the first jurisdictional restriction and/or the second jurisdictional restriction has changed. A change to the first jurisdictional restriction and/or the second jurisdictional restriction may occur, for example, as a result of a change to the data storage and/or privacy laws in the first location/jurisdiction 202 or the second location/jurisdiction 204, respectively. In response to determining that the first jurisdictional restriction and/or the second jurisdictional restriction has changed, it can be determined (i.e., redetermined) whether the first jurisdictional restriction among the first set of jurisdictional rules applicable to storage of the data is now more or less restrictive than the first jurisdictional restriction among the second set of jurisdictional rules applicable to storage of the data. For example, the compliance manager 230 may generally make such a determination. If, for example, at 170A it is determined that the first jurisdictional restriction among the first set of jurisdictional rules applicable to storage of the data remains more restrictive than the first jurisdictional restriction among the second set of jurisdictional rules applicable to storage of the data, at 180A, the data is maintained as stored in compliance with the first jurisdictional restriction among the first set of jurisdictional rules applicable to storage of the data. For example, the compliance manager 230 may store the data in the database 210 (or maintain storage of the data in the database 210, as the case may be), which may be present in the first location/jurisdiction 202 or elsewhere. Conversely, if at 170B it is determined that the first jurisdictional restriction among the first set of jurisdictional rules applicable to storage of the data has become less restrictive than the first jurisdictional restriction among the second set of jurisdictional rules applicable to storage of the data, at 180B, the data is transferred to the second jurisdiction and, at 180C, the data is stored in compliance with the first jurisdictional restriction among the second set of jurisdictional rules applicable to storage of the data. Again, the compliance manager 230 may store the data in the database 210, which may be present in the second location/jurisdiction 204 or elsewhere. In this way, compliance manager 230 may periodically or continuously determine which jurisdictional rules are more or less restrictive than others and store or maintain the data according to such determinations, as described herein.

Referring now to FIG. 3, an example sub-methodology 100A is illustrated for providing a synthesized compliance solution for data storage. With reference back to FIG. 2, sub-methodology 100A may optionally be implemented after 130 of methodology 100. Sub-methodology 100A may generally be implemented where the data includes a first portion of data and a second portion of data and/or it is desirable to provide a synthesized compliance solution for data storage (i.e., a compliance solution that applies different jurisdictional rules to different portions of data).

As illustrated in FIG. 3, sub-methodology 100A starts at 140A where it is determined whether a first jurisdictional restriction among the first set of jurisdictional rules applicable to storage of the first portion of data is more or less restrictive than a first jurisdictional restriction among the second set of jurisdictional rules applicable to storage of the first portion of data. For example, the compliance manager 230 may generally make such a determination. If, for example, it is determined that the first jurisdictional restriction among the first set of jurisdictional rules applicable to storage of the first portion of data is more restrictive than the first jurisdictional restriction among the second set of jurisdictional rules applicable to storage of the first portion of data, at 150A, the first portion of data is stored in compliance with the first jurisdictional restriction among the first set of jurisdictional rules applicable to storage of the first portion of data (as illustrated in FIG. 3). For example, the compliance manager 230 may store the first portion of data in the database 210, which may be present in the first location/jurisdiction 202 or elsewhere. Conversely, if it is determined that the first jurisdictional restriction among the first set of jurisdictional rules applicable to storage of the first portion of data is less restrictive than the first jurisdictional restriction among the second set of jurisdictional rules applicable to storage of the first portion of data, the first portion of data is stored in compliance with the first jurisdictional restriction among the second set of jurisdictional rules applicable to storage of the first portion of data (not shown).

Similarly, at 140B, it is determined whether a second jurisdictional restriction among the first set of jurisdictional rules applicable to storage of the second portion of data is more or less restrictive than a second jurisdictional restriction among the second set of jurisdictional rules applicable to storage of the second portion of data. For example, the compliance manager 230 may generally make such a determination. If, for example, it is determined that the second jurisdictional restriction among the second set of jurisdictional rules applicable to storage of the first portion of data is less restrictive than the second jurisdictional restriction among the second set of jurisdictional rules applicable to storage of the second portion of data, at 150B, the second portion of data is stored in compliance with the second jurisdictional restriction among the second set of jurisdictional rules applicable to storage of the second portion of data (as illustrated in FIG. 3). For example, the compliance manager 230 may store the second portion of data in the database 210, which may be present in the second location/jurisdiction 204 or elsewhere. Conversely, if it is determined that the second jurisdictional restriction among the first set of jurisdictional rules applicable to storage of the first portion of data is more restrictive than the second jurisdictional restriction among the second set of jurisdictional rules applicable to storage of the second portion of data, the second portion of data is stored in compliance with the second jurisdictional restriction among the first set of jurisdictional rules applicable to storage of the second portion of data (not shown).

Turning now to FIG. 4, another example sub-methodology 100B is illustrated for providing or updating a compliance solution for data storage for a user/client that has relocated from one location/jurisdiction to another. With reference back to FIG. 2, sub-methodology 100B may optionally be implemented after 130 of methodology 100. Sub-methodology 100B may generally be implemented where it is desirable to provide a compliance solution for data storage based upon a determined location of a client.

As illustrated in FIG. 4, sub-methodology 100B starts at 131 wherein a location of the client (e.g., client 220 from whom the request to store data was received) is determined. In embodiments, the location of the client may be determined by any suitable means known in the art, such as accessing activity of the client, accessing location information provided by the client, or the like, including combinations thereof.

In some embodiments, after determining a location of the client at 131, certain actions may be taken by (e.g., by the compliance manager 230) at 135A-C. At 135A, based on the location of the client, the client's request to store data may be denied. For example, it may be determined that, based on the client's location, compliant storage of the data is impossible or impractical (e.g., not legally permissible, overly costly or resource intensive). At 135B, based on the location of the client, the client may be provided with a disclaimer regarding storage of the data. For example, it may be determined that, based on the client's location, storage of the data may or will not be compliant, and the client may be informed that continued storage of the data may or will be non-compliant. At 135C, based on the location of the client, the client may be required to provide informed consent regarding storage of the data. For example, it may be determined that, based on the client's location, storage of the data may or will not be compliant, and the client may be required to provide informed consent that continued storage of the data may or will be non-compliant.

At 132, it may be determined whether the first set of jurisdictional rules, the second set of jurisdictional rules, or both are applicable to storage of the data based on the location of the client. For example, the compliance manager 230 may generally make such a determination. If the client 220 is permanently or temporarily located within the first location/jurisdiction 202 or the second location/jurisdiction 204, it may be determined that the first set of jurisdictional rules associated with the first location/jurisdiction 202 or the second set of jurisdictional rules associated with the second location/jurisdiction 204 is applicable to storage of the data.

At 133, it may be determined that the client has relocated from the first location/jurisdiction 202 to the second location/jurisdiction 204. For example, the compliance manager 230 may generally make such a determination. In embodiments, determining that the client has relocated from the first location/jurisdiction 202 to the second location/jurisdiction 204 may include any suitable means known in the art, such as accessing activity of the client, accessing location information provided by the client, or the like, including combinations thereof. As will be appreciated, providing a compliance solution for data storage may be particularly useful for clients and/or users that frequently move between locations/jurisdictions (e.g., military personnel and their families).

In some embodiments, after determining that the client has relocated from the first location/jurisdiction 202 to the second location/jurisdiction 204 at 133, the data may be stored in compliance with the first jurisdictional restriction among the second set of jurisdictional rules applicable to storage of the data at 134. For example, the compliance manager 230 may store the data in the database 210, which may be present in the second location/jurisdiction 204 or elsewhere.

In the same or other embodiments, after determining that the client has relocated from the first location/jurisdiction 202 to the second location/jurisdiction 204 at 133, it can be determined whether the data can be in the second jurisdiction in compliance with the first jurisdictional restriction among the second set of jurisdictional rules applicable to storage of the data at 136. For example, the compliance manager 230 may generally make such a determination. If it is determined that the data can be stored in the second jurisdiction in compliance with the first jurisdictional restriction among the second set of jurisdictional rules applicable to storage of the data, the data may be transferred to the second jurisdiction at 137A and the data may be stored in compliance with the first jurisdictional restriction among the second set of jurisdictional rules applicable to storage of the data at 138A. Conversely, if it is determined that the data cannot be stored in the second jurisdiction in compliance with the first jurisdictional restriction among the second set of jurisdictional rules applicable to storage of the data, the data may be prevented from being transferred to the second jurisdiction at 137B and the data may be maintained as stored in compliance with the first jurisdictional restriction among the first set of jurisdictional rules applicable to storage of the data at 138B.

Figure 5:
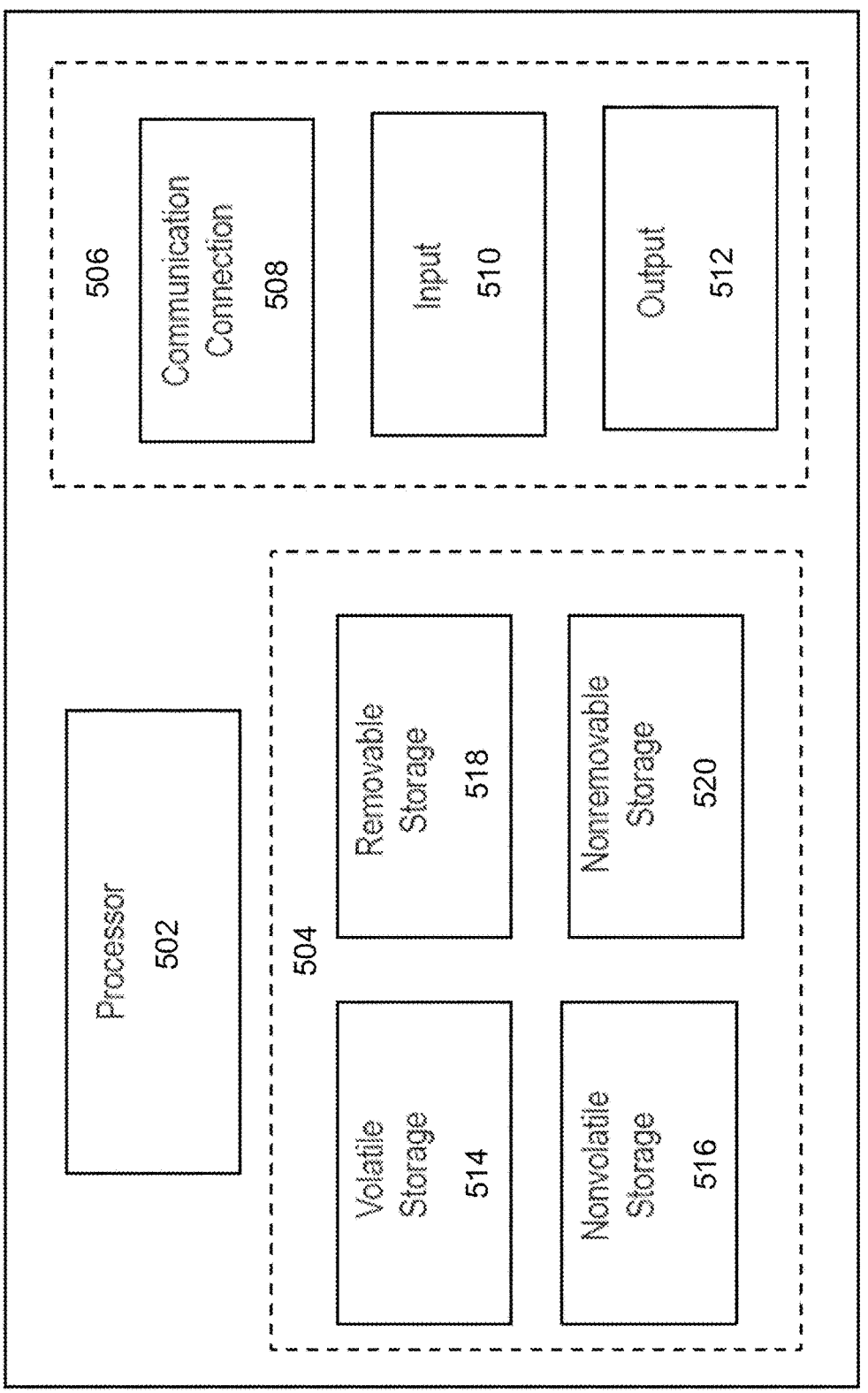
FIG. 5 is a block diagram illustrating an example implementation of a device which can be utilized in conjunction with or comprise a portion of systems disclosed herein and/or implement or execute methods disclosed herein.

Aspects disclosed herein can be implemented using computer devices and networks. FIG. 5 illustrates a device 500. Device 500 may comprise all or a part of modules or components herein. Device 500 may comprise hardware or a combination of hardware and software. The functionality to facilitate telecommunications via a telecommunications network may reside in one or combinations of links, portals, or connections. Device 500 depicted in FIG. 5 may represent or perform functionality of an appropriate device 500, or combination of modules or components herein. It is emphasized that the block diagram depicted in FIG. 5 is an example and not intended to imply a limitation to a specific implementation or configuration. Thus, device 500 may be implemented in a single device or multiple devices. Multiple network entities may be distributed or centrally located. Multiple network entities may communicate wirelessly, via hard wire, or any appropriate combination thereof.

Device 500 may comprise a processor 502 and a memory 504 coupled to processor 502. Memory 504 may contain executable instructions that, when executed by processor 502, cause processor 502 to effectuate operations associated with aspects disclosed herein. As evident from the description herein, device 500 is not to be construed as software per se.

In addition to processor 502 and memory 504, device 500 may include an input/output system 506. Processor 502, memory 504, and input/output system 506 may be coupled together (coupling not shown in FIG. 5) to allow communications there between. Each portion of device 500 may comprise circuitry for performing functions associated with each respective portion. Thus, each portion may comprise hardware, or a combination of hardware and software. Accordingly, each portion of device 500 is not to be construed as software per se. Input/output system 506 may be capable of receiving or providing information from or to a communications device or other network entities configured for telecommunications. For example input/output system 506 may include a wireless communications (e.g., WiFi/ 2.5G/3G/4G/5G/GPS) card. Input/output system 506 may be capable of receiving or sending video information, audio information, control information, image information, data, or any combination thereof. Input/output system 506 may be capable of transferring information with device 500. In various configurations, input/output system 506 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 506 may comprise a WiFi finder, a two-way GPS chipset or equivalent, or the like, or a combination thereof.

Input/output system 506 of device 500 also may contain communication connection 508 that allows device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with aspects described herein. For example, processor 502 may be capable of, in conjunction with any other portion of device 500, managing social media communications as described herein.

Memory 504 of device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a nonremovable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 500. Memory 504 may comprise executable instructions that, when executed by processor 502, cause processor 502 to effectuate operations for, e.g., instantiating processes or nodes, interrogating metadata, updating metadata, et cetera.

Figure 6:
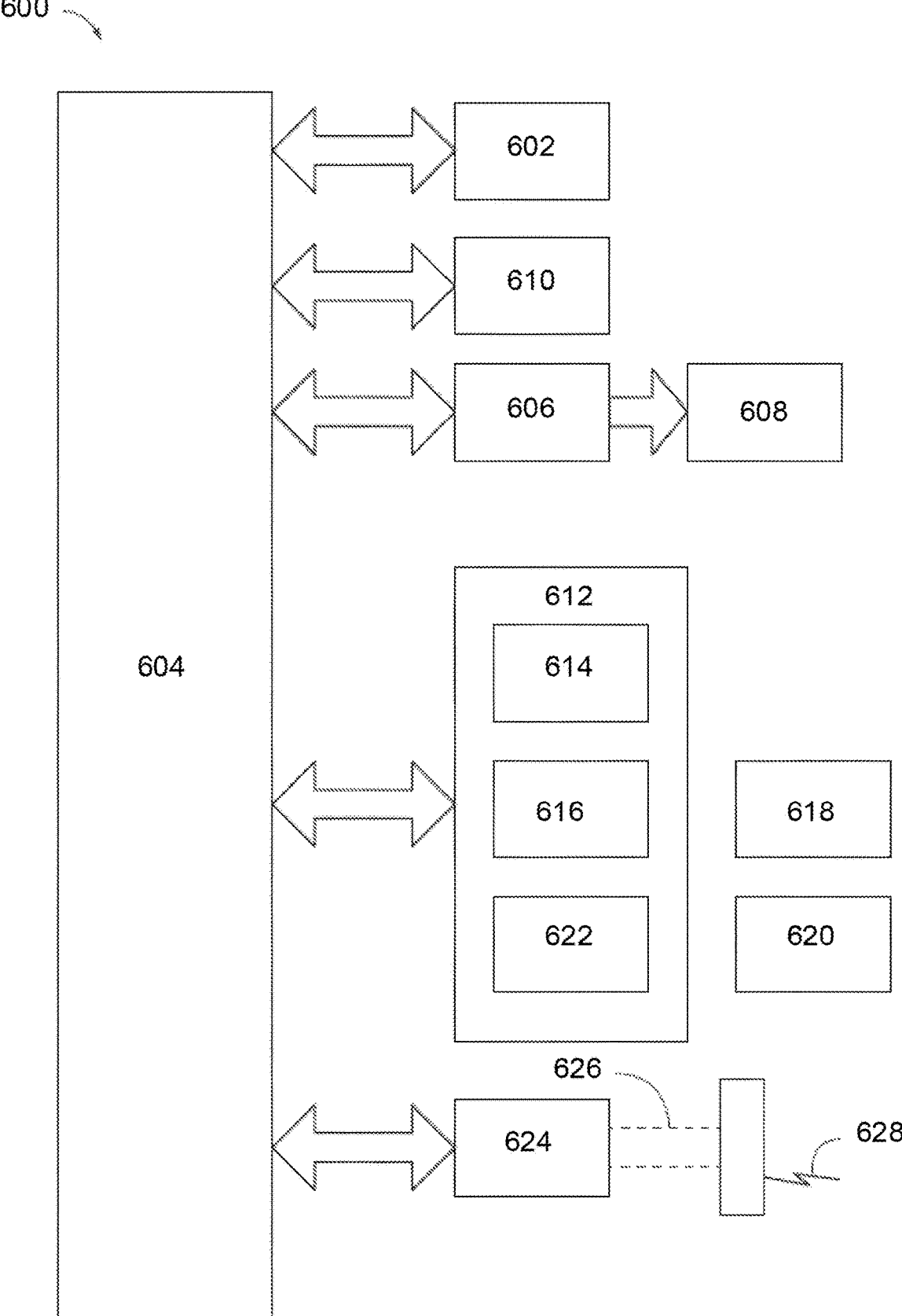
FIG. 6 is a block diagram of a computer system that be used to implement at least a portion of aspects herein.

FIG. 6 illustrates a computer-based system 600 that may constitute, include parts of, or be used to realize one or more of aspects of, e.g., systems 200 or 400, device 500, or methodologies and techniques described herein. Computer-based system 600 includes at least one processor, such as a processor 602. Processor 602 may be connected to a communication infrastructure 604, for example, a communications bus, a cross-over bar, a network, or the like. Various software aspects are described in terms of this example computer-based system 600. Upon perusal of the present description, it will become apparent to a person skilled in the relevant art(s) how to implement the present disclosure using other computer systems or architectures.

Computer-based system 600 includes a display interface 606 that forwards graphics, text, or other data from communication infrastructure 604 or from a frame buffer (not shown) for display on a display unit 608.

Computer-based system 600 further includes a main memory 610, such as random access memory (RAM), and may also include a secondary memory 612. Secondary memory 612 may further include, for example, a hard disk drive 614 or a removable storage drive 616, representing a floppy disk drive, a magnetic tape drive, an optical disk drive, etc. Removable storage drive 616 reads from or writes to a removable storage unit 618 in a well-known manner. Removable storage unit 618 may represent a floppy disk, magnetic tape, or an optical disk, and may be read by and written to by removable storage drive 616. As will be appreciated, removable storage unit 618 includes a computer usable storage medium having computer software or data stored therein.

In accordance with various aspects of the present disclosure, secondary memory 612 may include other similar devices for allowing computer programs or other instructions to be loaded into computer-based system 600. Such devices may include, for example, a removable storage unit 620 and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 620 to computer-based system 600.

Computer-based system 600 may further include communication interface 624. Communication interface 624 may allow software or data to be transferred between computer-based system 600 and external devices. Examples of communication interface 624 include, but may not be limited to a modem, a network interface (such as an Ethernet card), a communications port, a Personal Computer Memory Card International Association (PCMCIA) slot and card, or the like. Software or data transferred via communication interface 624 may be in the form of a number of signals, hereinafter referred to as signals 626, which may be electronic, electromagnetic, optical or other signals capable of being received by communication interface 624. Signals 626 may be provided to communication interface 624 via a communication path (e.g., channel) 628. Communication path 628 carries signals 626 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 616, a hard disk installed in hard disk drive 614, or the like. These computer program products provide software to computer-based system 600. The present disclosure is directed to such computer program products.

Computer programs (also referred to as computer control logic) may be stored in main memory 610 or secondary memory 612. The computer programs may also be received via communication interface 604. Such computer programs, when executed, enable computer-based system 600 to perform the functions consistent with the present disclosure, as discussed herein. In particular, the computer programs, when executed, enable processor 602 to perform the features of the present disclosure. Accordingly, such computer programs represent controllers of computer-based system 600.

In accordance with an aspect of the present disclosure, where the disclosure is implemented using a software, the software may be stored in a computer program product and loaded into computer-based system 600 using removable storage drive 616, hard disk drive 614, or communication interface 624. The control logic (software), when executed by processor 602, causes processor 602 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

A "module" or "component" herein can refer to a portion of a system, implemented locally or remotely or in combinations of local and remote systems, configured to perform a function that can be implemented using software, hardware, or combinations thereof in the above-described computing and network environments.

Various aspects disclosed herein are to be taken in the illustrative and explanatory sense and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special purpose computer, or other programmable data-processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network based portal.

Methodologies herein are described with specific aspects for ease of explanation with respect to various embodiments. However, methodologies embraced under the scope and spirit of the disclosure may vary, to include excluding particular aspects or comparisons described.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A method for providing a compliance solution for data storage, the method comprising:

receiving a request to store data;

accessing a first set of jurisdictional rules applicable to storage of the data, wherein the first set of jurisdictional rules are associated with a first jurisdiction;

accessing a second set of jurisdictional rules applicable to storage of the data, wherein the second set of jurisdictional rules are associated with a second jurisdiction different from the first jurisdiction and the first set of jurisdictional rules and the second set of jurisdictional rules are divergent with respect to storage of the data;

determining that a first jurisdictional restriction among the first set of jurisdictional rules applicable to storage of the data is more restrictive than a first jurisdictional restriction among the second set of jurisdictional rules applicable to storage of the data; and storing the data in compliance with the first jurisdictional restriction among the first set of jurisdictional rules applicable to storage of the data.

2. The method of claim 1, wherein the data includes a first portion of data and a second portion of data, the method further comprising providing a synthesized compliance solution for data storage by:

determining that a first jurisdictional restriction among the first set of jurisdictional rules applicable to storage of the first portion of data is more restrictive than a first jurisdictional restriction among the second set of jurisdictional rules applicable to storage of the first portion of data;

determining that a second jurisdictional restriction among the first set of jurisdictional rules applicable to storage of the second portion of data is less restrictive than a second jurisdictional restriction among the second set of jurisdictional rules applicable to storage of the second portion of data;

storing the first portion of data in compliance with the first jurisdictional restriction among the first set of jurisdictional rules applicable to storage of the first portion of data; and storing the second portion of data in compliance with the second jurisdictional restriction among the second set of jurisdictional rules applicable to storage of the second portion of data.

3. The method of claim 1, wherein accessing the first set of jurisdictional rules includes accessing the first set of jurisdictional rules from a database storing a plurality of sets of jurisdictional rules.

4. The method of claim 3, wherein accessing the second set of jurisdictional rules includes accessing the second set of jurisdictional rules from the database.

5. The method of claim 1, wherein the request to store data is received from a client.

6. The method of claim 5, further comprising determining a location of the client.

7. The method of claim 6, further comprising, based on the location of the client, denying the client's request to store data.

8. The method of claim 6, further comprising, based on the location of the client, providing a disclaimer to the client regarding storage of the data.

9. The method of claim 6, further comprising, based on the location of the client, requiring the client to provide informed consent regarding storage of the data.

10. The method of claim 6, further comprising determining whether the first set of jurisdictional rules, the second set of jurisdictional rules, or both are applicable to storage of the data based on the location of the client.

11. The method of claim 10, further comprising determining that the client has relocated from the first jurisdiction to the second jurisdiction.

12. The method of claim 11, further comprising storing the data in compliance with the first jurisdictional restriction among the second set of jurisdictional rules applicable to storage of the data.

13. The method of claim 11, wherein determining that the client has relocated from the first jurisdiction to the second jurisdiction includes accessing activity of the client.

14. The method of claim 11, wherein determining that the client has relocated from the first jurisdiction to the second jurisdiction includes accessing location information provided by the client.

15. The method of claim 11, further comprising determining whether the data can be stored in the second jurisdiction in compliance with the first jurisdictional restriction among the second set of jurisdictional rules applicable to storage of the data.

16. The method of claim 15, wherein it is determined that the data can be stored in the second jurisdiction in compliance with the first jurisdictional restriction among the second set of jurisdictional rules applicable to storage of the data, the method further comprising:

transferring the data to the second jurisdiction and storing the data in compliance with the first jurisdictional restriction among the second set of jurisdictional rules applicable to storage of the data.

17. The method of claim 15, wherein it is determined that the data cannot be stored in the second jurisdiction in compliance with the first jurisdictional restriction among the second set of jurisdictional rules applicable to storage of the data, the method further comprising:

preventing transfer of the data to the second jurisdiction and maintaining storage of the data in compliance with the first jurisdictional restriction among the first set of jurisdictional rules applicable to storage of the data.

18. The method of claim 1, further comprising determining that at least one of the first jurisdictional restriction and the second jurisdictional restriction has changed.

19. The method of claim 18, further comprising:

determining that the first jurisdictional restriction among the first set of jurisdictional rules applicable to storage of the data remains more restrictive than the first jurisdictional restriction among the second set of jurisdictional rules applicable to storage of the data; and maintaining the data as stored in compliance with the first jurisdictional restriction among the first set of jurisdictional rules applicable to storage of the data.

20. The method of claim 18, further comprising:

determining that the first jurisdictional restriction among the first set of jurisdictional rules applicable to storage of the data has become less restrictive than the first jurisdictional restriction among the second set of jurisdictional rules applicable to storage of the data; and transferring the data to the second jurisdiction and storing the data in compliance with the first jurisdictional restriction among the second set of jurisdictional rules applicable to storage of the data.

* * * * *